United States Patent
Mori

[11] 3,836,921
[45] Sept. 17, 1974

[54] CAMERA EYEPIECE LIGHT COMPENSATION ARRANGEMENT

[75] Inventor: Chiharu Mori, Tokyo, Japan

[73] Assignee: Asahi Kogaku Kogyo Kabushiki Kaisha, Tokyo, Japan

[22] Filed: May 5, 1971

[21] Appl. No.: 140,512

[30] Foreign Application Priority Data
May 28, 1970 Japan.............................. 45-45808

[52] U.S. Cl.................... 354/31, 354/51, 354/60
[51] Int. Cl....... G03b 7/08, G03b 17/00, G01j 1/46
[58] Field of Search .......... 95/10 C, 10 CT, 10 PO, 95/42, 53 E, 53 EA, 53 EB; 356/219, 222, 223, 225, 226

[56] References Cited
UNITED STATES PATENTS

| | | |
|---|---|---|
| 3,324,779 | 6/1967 | Tsukumo Nobusawa et al. ...... 95/42 |
| 3,442,190 | 5/1969 | Erickson........................... 95/10 CT |
| 3,470,798 | 10/1969 | Seinan Miyakawa............. 95/10 CT |
| 3,533,348 | 10/1970 | Akio Yanagi................. 95/10 CT X |

FOREIGN PATENTS OR APPLICATIONS

| | | |
|---|---|---|
| 398,295 | 2/1966 | Switzerland........................ 356/219 |

Primary Examiner—Joseph F. Peters, Jr.
Attorney, Agent, or Firm—Steinberg & Blake

[57] ABSTRACT

A camera having circuitry capable of compensating for light entering through an eyepiece of the camera, so that the exposures will not be rendered inaccurate due to light entering through the eyepiece. The circuitry is capable of measuring the light entering through the objective of the camera as well as through the eyepiece of the camera, and the total of the light entering through the objective and eyepiece is converted into an electrical quantity in the form of a collector current of a transistor. Also, the circuitry measures only the light entering through the eyepiece and converts this light into an electrical quantity in the form of the collector current of a second transistor. The electrical circuitry has conductors which direct these collector currents to a common junction to which there is connected an output conductor for conducting an electrical quantity in the form of an output current equal to the difference between the collector current corresponding to the total light entering through the objective and eyepiece and the collector current corresponding to the light entering only through the eyepiece, so that in this way the output current corresponds only to the light entering through the objective and can be used in the determination of the extent to which film in the camera is exposed.

16 Claims, 7 Drawing Figures

CAMERA EYEPIECE LIGHT COMPENSATION ARRANGEMENT

BACKGROUND OF THE INVENTION

The present invention relates to cameras.

In particular, the present invention relates to single-lens reflex cameras where exposures are automatically determined utilizing light which has passed through the objective. Thus, the present invention is particularly designed for through-the-lens (TTL) single lens reflex cameras.

As is well known, with cameras of this type before an exposure is actually made a tiltable mirror serves to reflect the light entering through the objective up to the viewfinder where the object to be photographed is visible through an eyepiece of the viewfinder. As is well known, immediately before exposure this mirror is tilted upwardly beyond the optical axis so that the film can be exposed with light entering through the objective.

A particular problem encountered with cameras of this type is that light cannot be prevented from entering into the camera through the eyepiece inasmuch as the light-receiving element is positioned in the light path of the range finder. Various attempts have been made to eliminate the influence of light entering through the eyepiece, such as by utilizing different types of constructions with respect to the position of the light-receiving element, the arrangement of the optical system for light measurement, etc. However, none of the known constructions are capable of completely eliminating the influence of light which enters through the eyepiece. Cameras of the above type which use a stop-down diaphragm light measurement system are particularly liable to undesirable influence by light which enters through the eyepiece.

SUMMARY OF THE INVENTION

It is accordingly a primary object of the present invention to provide a camera with a structure which is capable of eliminating the above drawbacks by achieving a complete compensation for the light which enters through the eyepiece.

In particular, it is an object of the present invention to provide a camera with a structure which does not rely upon mechanical contrivances to eliminate the influence of eyepiece entering light and instead relies only upon transistorized electrical circuitry for this purpose.

Thus, it is an object of the present invention to provide a camera which is capable of compensating perfectly for eyepiece entering light irrespective of the conventional mechanical arrangement of the camera components.

It is also an object of the present invention to provide for a camera circuitry capable of achieving the above objects while at the same time being characterized by an extremely small temperature dependency as well as an extremely small source voltage dependency.

Also, it is an object of the present invention to provide a construction of this type which is exceedingly simple so that it lends itself to inexpensive mass-production manufacturing techniques without in any way detracting from the accuracy of the operation of the parts.

The camera has an objective through which light enters to make the exposure as well as an eyepiece through which light also enters into the interior of the camera. According to the invention a photoresponsive means is provided for receiving the light entering through the objective and through the eyepiece and for converting this received light into a corresponding electrical quantity. An eyepiece light measuring means is also provided for measuring only the light entering through the eyepiece and converting this latter light into a corresponding electrical quantity. An electrical circuit means is provided for subtracting the quantity corresponding to eyepiece light from the quantity corresponding to the total light entering through the eyepiece and objective, achieving in this way an output electrical quantity corresponding to the difference between the eyepiece light and the light which is received by the photoresponsive means, so that this output quantity can then be used in the determination of the extent to which film in the camera is exposed.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
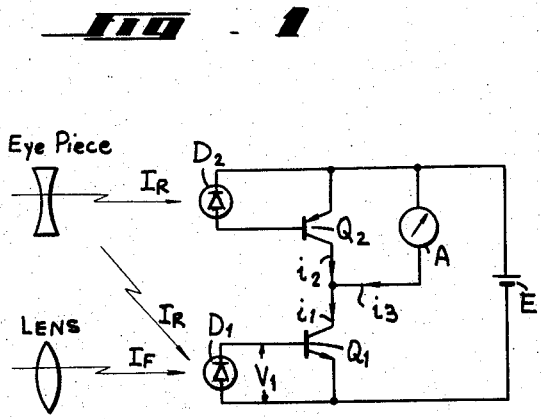
FIG. 1 is a schematic diagram of circuitry and components illustrating the principle of the present invention.

Referring first to FIG. 1 which illustrates in particular the principles upon which the present invention is based, it will be seen that the illustrated circuit includes a current source E. The illustrated circuitry also includes a photosensitive means made up of a pair of light-receiving elements $D_1$ and $D_2$, these elements being photovoltaic elements such as silicon photocells in the illustrated example. The photovoltaic element $D_1$ is arranged to receive light $I_F$ entering through the objective indicated by the schematically represented lens in FIG. 1 as well as light $I_R$ entering through the eyepiece which is also schematically represented in FIG. 1. On the other hand, the photovoltaic element $D_2$ receives only light $I_R$ from the eyepiece.

The circuit further includes transistors $Q_1$ and $Q_2$ which are respectively of NPN and PNP types and which respectively have equal electrical characteristics, with the polarities reversed with respect to each other, and the transistors are connected in series as shown in FIG. 1.

Thus, the photovoltaic element $D_1$ receives the light input component $I_F$, coming from the object to be photographed through the objective, and the component $I_R$ entering through the eyepiece. As is well known this light will provide through the photovoltaic element $D_1$ a voltage $V_1$ across the terminals of the light-receiving element $D_1$, and this voltage $V_1$ is in proportion to the logarithmic value of the light input intensity corresponding to the components $I_F$ and $I_R$ at the time of the light measurement. The logarithmic compression rate of the photoelectric transformation characteristic of the light-measuring photovoltaic element $D_1$ is made equal to the logarithmic expansion rate of the base-emitter voltage *vs.* the collector current characteristic of the transistor $Q_1$ whose input is the output voltage $V_1$, so that the collector current $i_1$ of the transistor $Q_1$ is proportional to the light input intensity equal to the total of components $I_F$ and $I_R$ at the time of light measurement. Thus, the transistor $Q_1$ can be considered as a type of constant current source having a constant current characteristic due to the collector characteristic. Thus it will be seen that the transistor $Q_1$ and the photovoltaic element $D_1$ form a photoresponsive means ror receiving the light entering through the objective and the eyepiece and for converting this light into an electrical quantity, namely the collector current $i_1$, which corresponds to the received light.

In the same way, the photovoltaic element $D_2$ forms that part of the photosensitive means which measures only the light component $I_R$, and this photovoltaic element $D_2$ which corresponds in all ways to the photovoltaic element $D_1$ is electrically connected in the same way to the transistor $Q_2$ which is of the same characteristics as the transistor $Q_1$ so that the photovoltaic element $D_2$ and the transistor $Q_2$ form an eyepiece light measuring means for receiving the eyepiece-entering light and converting into an electrical quantity in the form of the collector current $i_2$ which corresponds to the eyepiece light. Thus the collector current $i_2$ is proportional to the eyepiece-entering light component $I_R$, and the transistor $Q_2$ may aso be considered as a type of constant current source having a constant current characteristic due to the collector characteristic.

As may be seen from FIG. 1, the circuitry includes an electrical circuit means having conductors for conducting the collector currents $i_1$ and $i_2$ to a common junction to which there is also connected a conductor of the electrical circuit means in which the output current $i_3$ flows, this output current flowing through the illustrated ammeter A. Of course, the light component $I_F$ will in general be greater than the eyepiece entering light component $I_R$, so that the output current $i_3$ is proportional only to the light input component $I_F$, corresponding to the light entering through the objective from the object which is to be photographed, and thus the output current $i_3$ is an electrical quantity corresponding to the difference between the collector currents $i_1$ and $i_2$ and thus corresponding to the light component $I_F$. This output current $i_3$ which is proportional only to the light input component from the object to be photographed is a charging current source having a constant current characteristic. This output current $i_3$ is utilized as the photoelectric transformation output of the light input intensity from the object to be photographed, so that it is possible to utilize this quantity $i_3$ in an electric shutter control circuit which determines the extent of exposure of film in the camera. Thus this latter shutter control circuit can be provided with the electrical quantity $i_3$ which is completely compensated for the eyepiece-entering light influence encountered in TTL single lens reflex cameras.

Figure 5:
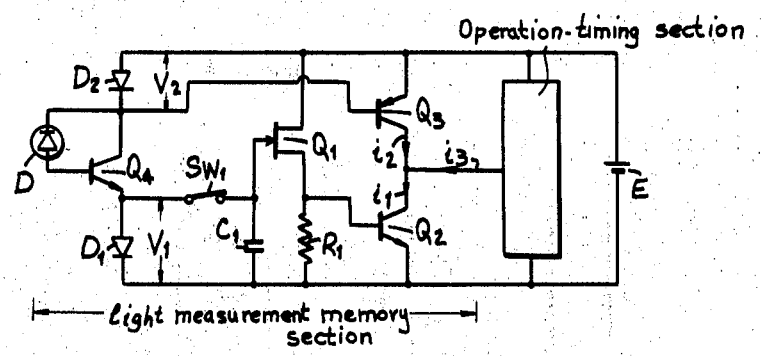
Figure 6:
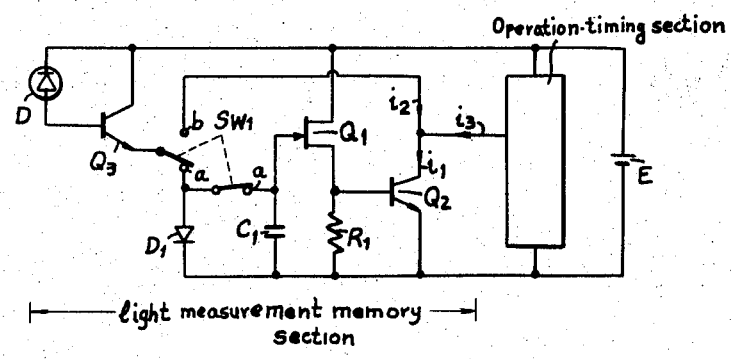
Figure 7:
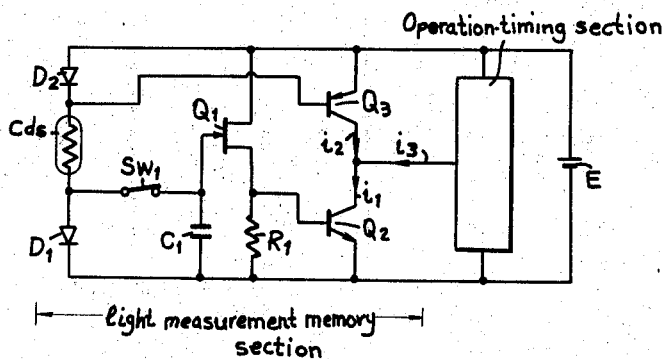

While in the above example of FIG. 1 the photosensitive means is constituted by a pair of light-receiving elements $D_1$ and $D_2$, in the embodiments which are respectively illustrated in FIGS. 2-7 there is only a single light-receiving element which in the embodiments of FIGS. 2-6 is a photovoltaic element and which in the embodiment of FIG. 7 is a photoconductive element. Each of the embodiments of FIGS. 2-7 includes a switch means which serves to connect the single light-receiving element first into the circuit which receives the light components entering through the objective and the eyepiece and then into the circuit which measures only the light entering through the eyepiece. In order to retain in the circuit the collector current $i_1$ corresponding to the total light the totalling means has a memory means for retaining this current $i_1$ while the eyepiece light is measured by the eyepiece light measuring means to provide the collector current $i_2$.

Figure 2:
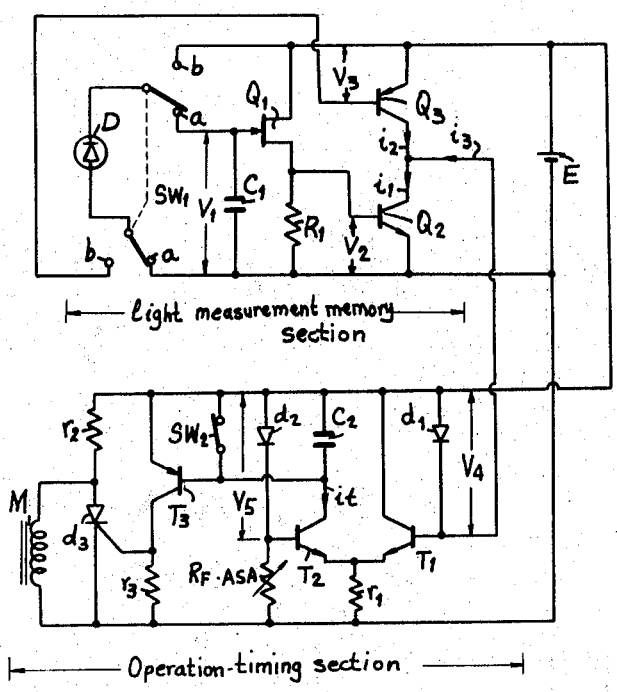
FIGS. 2-7 respectively illustrate different embodiments of circuitry of the present invention particularly suited for single lens reflex cameras of the type which measure internal light for exposure purposes.

Referring to FIG. 2 the light measurement memory section illustrated therein includes the photosensitive means formed by the single photovoltaic element D. The illustrated circuit includes the current source E as well as the transistors $Q_2$ and $Q_3$ which are of common characteristics but reverse polarity and which are connected in series with the conductors for the collector currents $i_1$ and $i_2$ having a common junction to which the conductor for the output current $i_3$ is connected.

The photosensitive means D of FIG. 2 is a P - N junction photovoltaic element across the terminals of which there is the voltage $V_1$, this photosensitive means D being a silicon photocell in the illustrated example. The photosensitive means D is permanently connected between the blades of a double-pole double-throw memory switch $SW_1$, and in the first position of this switch means $SW_1$ the blades thereof engage a pair of contacts $a$, while in the next position thereof, just prior to swinging up of the mirror of the camera, these blades of the switch means will be displaced in a known way into engagement with the contacts $b$ of the switch means. Thus, when the switch means $SW_1$ has the position illustrated in FIG. 2 for measuring the total of the components $I_F$ and $I_R$, the generated voltage $V_1$ is proportional to the logarithmic value of the intensity of the light input of the components $I_F$ and $I_R$. The circuit includes the memory capacitor $C_1$ which is thus charged by the voltage $V_1$ in the first position of the switch means $SW_1$. Immediately before the mirror is swung up upon operation of the shutter-release element of the camera, the blades of the switch means $SW_1$ are displaced away from the first pair of contacts $a$ and into engagement with the second pair of contacts $b$. The voltage $V_1$ acts also as the input voltage to a source-follower circuit consisting of the field effect transistor $Q_1$ and the resistor $R_1$, so that after the double-pole double-throw switch means $SW_1$ has its blades displaced into engagement with the second pair of contacts $b$, the output voltage $V_2$ of the source-follower circuit is maintained constant. This output voltage $V_2$ acts as the input to the next-stage light measurement memory section output transistor $Q_2$, so that the collector current $i_1$ of the transistor $Q_2$ has a value determined by the light input intensity corresponding to the components $I_F$ and $I_R$ of the photovoltaic element D.

Thus, when the shutter-release button of the camera is actuated and the memory switch means $SW_1$ is displaced from the first pair of contacts $a$ to the second pair of contacts $b$ immediately before swinging up of the mirror, the collector current $i_1$ is retained after the mirror has swung up, and the photosensitive means D now receives only the eyepiece-entering light for measuring only the component $I_R$. Now the output voltage $V_3$ of the photosensitive means D acts as the input across the base and emitter of the transistor $Q_3$ of the eyepiece light measuring means, so that the collector current $i_2$ of the transistor $Q_3$ has a value which corresponds only to the eyepiece-entering light component $I_R$.

The photoelectric output characteristic of the light measurement memory section which consists of the photovoltaic element D, the field effect transistor $Q_1$, the capacitor $C_1$, the resistor $R_1$ and the transistor $Q_2$, is arranged to coincide with the photoelectric output characteristic of the eyepiece-entering light compensation section consisting of the photovoltaic element D and the transistor $Q_3$, so that the output current $i_3$ of the light measurement memory section, which is equal to the collector current $i_1$ of transistor $Q_2$ corresponding to the light input intensity corresponding to components $I_F$ and $I_R$ during light measurement minus the collector current $i_2$ of the transistor $Q_3$ determined only by the eyepiece-entering light intensity $I_R$, has a value corresponding only to the light input intensity $I_F$ coming from the object which is to be photographed.

In the operation-timing section illustrated in FIG. 2, the output current $i_3$ of the light measurement memory section is logarithmically compressed by a logarithmic compression element $d_1$, so that, as is well known, the voltage $V_4$ across the terminals of the logarithmic compression element $d_1$ varies linearly with the exponential function variation of the light input intensity $I_F$ coming from the object to be photographed. In addition the voltage $V_5$ across the terminals of a second logarithmic compression element $d_2$ varies linearly with the exponential function variation of the resistance value of a variable resistor $R_{F \cdot ASA}$. This is a conventional variable resistor which is set to a predetermined resistance corresponding to the combination of the selected aperture of the diaphragm and the film speed.

The voltages $V_4$ and $V_5$ across the terminals of the logarithmic compression elements, in the form of suitable diodes, for example, are supplied to the bases of a pair of computation and logarithmic expansion or extension transistors $T_1$ and $T_2$ as inputs to the computation and logarithmic expansion or extension section consisting of the transistors $T_1$ and $T_2$ and a resistor $r_1$, so as to carry out the photographic computation. The characteristics of the logarithmic compression elements $d_1$ and $d_2$, the computation and logarithmic extension transistors $T_1$ and $T_2$, the resistor $r_1$ and the variable resistor for introducing the aperture size and film speed are so selected that the collector current of the logarithmic extension transistor $T_2$, namely the timing charging current $i_t$, conforms to the Apex index.

In addition, the capacity of the timing capacitor $C_2$ and the switch-over level of a switching circuit consisting of the transistor $T_3$, an SCR $d_3$, resistors $r_2$ and $r_3$ and electromagnet M are so selected as to conform to the Apex index. Thus, the exposure time is obtained as the duration from the instant when the timing switch $SW_2$ is displaced from its closed to its open condition. As is well known, this timing switch will operate in synchronism with the leading curtain of the focal plane shutter of the camera. When this leading curtain moves across the film gate from the shutter-closing to the shutter-opening position, the switch $SW_2$ is automatically opened, so that now the timing capacitor $C_2$ becomes charged. In accordance with the switch-over level of the switching circuit the electromagnet M is actuated, as by being deenergized, for example, to release the trailing curtain of the camera so that this trailing curtain is now driven by springs connected thereto in order to follow the leading curtain and close the shutter, thus terminating the exposure in a well known manner.

In the light measurement memory section illustrated in FIG. 2, the temperature dependencies of the photovoltaic element D and the transistor $Q_2$ and also the temperature dependencies of the photovoltaic element D and the transistor $Q_3$ cancel each other, so that the light measurement memory circuit is characterized by an extremely small temperature dependency and in addition, due to the circuit arrangement, by an extremely small source voltage dependency.

Thus it will be seen that with the embodiment of FIG. 2 the photosensitive means includes a single photovoltaic element D which through the switch means formed by the double-pole double-throw switch $SW_1$ is made common to and forms parts of the photoresponsive means which receives light entering through the objective and the eyepiece and the eyepiece light measuring means, this photosensitive means D of FIG. 2 serving in the first position of the switch means to provide the collector current $i_1$ and in the second position to provide the collector current $i_2$, with the circuitry conducting these currents to the common junction to which is connected a conductor for the output current $i_3$. The memory capacitor $C_1$ acts when the blades of the switch means are displaced into engagement with the second pair of contacts b to form a memory means to retain the collector current $i_1$.

Figure 3:
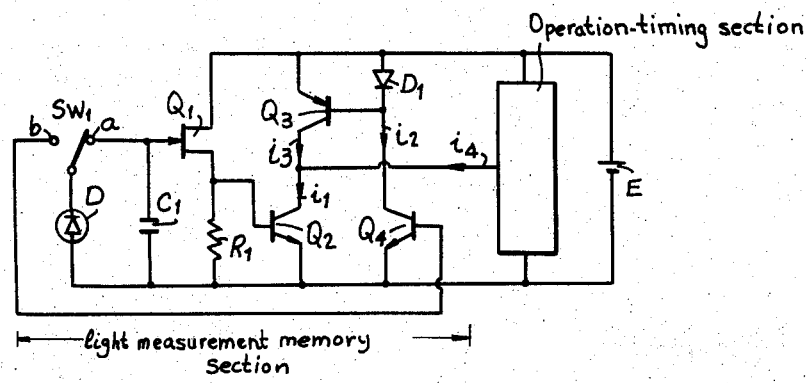

In the embodiment of the invention which is illustrated in FIG. 3 use is made of the same operation-timing section the details of which are illustrated in FIG. 2. Therefore, for the sake of simplicity this entire section is indicated as a single block in the circuit of FIG. 3. Also, in FIG. 3 the photoresponsive means is identical with that of FIG. 2, although a single-pole double-throw type of memory switch means $SW_1$ is used in this embodiment. The photosensitive means is also formed by the single photovoltaic element D, and the single blade of the switch means $SW_1$ of FIG. 3 is permanently connected to the photosensitive means D of FIG. 3. Initially during measurement of the light entering through the objective and the eyepiece the blade of the switch engages the contact a, so that initially the photovoltaic element D is connected across the terminals of the capacitor $C_1$, and it will be noted that precisely the same arrangement is obtained with the embodiment of FIG. 2 when the blades of the switch means thereof are connected to the pair of contacts a in FIG. 2. Thus, the photoresponsive means of FIG. 3 operates in the same way as that of FIG. 2 for achieving the collector current $i_1$ of the transistor $Q_2$ which corresponds to the total of the light entering through the objective and the eyepiece during light measurement. With this embodiment when the shutter-release button of the camera is actuated to release the shutter, immediately before the mirror swings up the single-pole double-throw memory switch means $SW_1$ is changed over so that its blade is displaced from the contact a and instead engages the contact b. Now the circuit of the photoresponsive means will act to retain the collector current $i_1$ in the manner described above. With the photosensitive means D now connected through the switch means to the contact b, only the light entering through the eyepiece will be measured since the mirror is in its upper position, and thus the eyepiece light measuring means operates at this time to measure only the light component $I_R$. The output voltage at this time acts as the input between the base and the emitter of the transistor $Q_4$ so that the value of the collector current $i_2$ of the transistor $Q_4$ corresponds to the eyepiece-entering light component $I_R$. This collector current $i_2$ is logarithmically compressed by the logarithmic compression element $D_1$, and the output voltage is applied as the input to a transistor $Q_3$, so that the collector current $i_3$ of the transistor $Q_3$ has a value corresponding only to and determined exclusively by the eyepiece-entering light intensity $I_R$. The photoelectric output characteristic of the light measurement memory section, which consists of the photovoltaic element D, the field effect type of transistor $Q_1$, the capacitor $C_1$, the resistor $R_1$ and the transistor $Q_2$, is arranged to coincide with the photoelectric output characteristic of the eyepiece-entering light compensation section consisting of the photovoltaic element D, the transistors Q3 and Q4, and the logarithmic compression element $D_1$, so that the output current $i_4$ of the light measurement memory section is obtained through the transistor $Q_2$ with the current value of the output current $i_4$ corresponding only to the light input intensity $I_F$ coming from the object which is to be photographed.

In the circuit of FIG. 3 the temperature dependencies of the photovoltaic element D and the transistor $Q_2$, and of the photovoltaic element D and the transistor $Q_4$ as well as of the logarithmic compression element $D_1$ and the transistor $Q_3$ all cancel each other. Therefore the entire circuit is characterized by an extremely small temperature dependency and also by a very small source voltage dependency as a result of the particular circuit construction. In addition, since the switch means $SW_1$ is of a single-pole double throw type, the light measurement memory circuit can be mass-produced with very great practical advantage.

Figure 4:
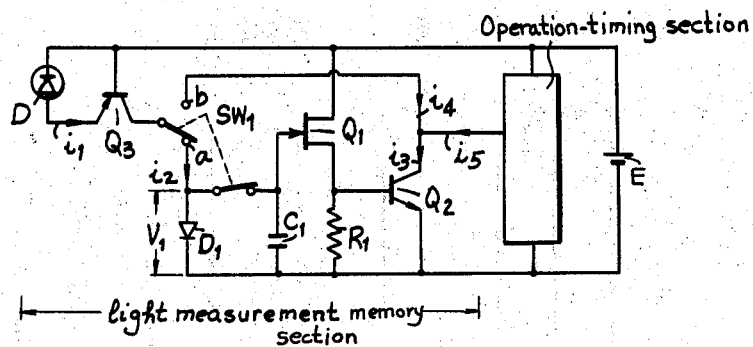

In the embodiment of FIG. 4, the photoresponsive means and eyepiece light measuring means both include in this case also a single photovoltaic element D which is common to both of these means, and in the embodiment of FIG. 4 there is a double-pole double-throw switch means $SW_1$ which initially has the position illustrated in FIG. 4 in order to render the photoresponsive means operative, this photoresponsive means having the memory capacitor $C_1$. Thus during measurement of the intensity made up of the components $I_F$ and $I_R$ the output current, upon short circuiting, from the photovoltaic element D, as is well known, will be proportional to the sum of components $I_F$ and $I_R$. It will be seen that in the circuit of FIG. 4 the output current $i_1$ of the photovoltaic element D acts as the input to the emitter of the illustrated base-grounded transistors $Q_3$ which in the illustrated example forms the transistor of the eyepiece light measuring means. By connecting the photovoltaic element D in this way between the base and emitter of the base-grounded transistor $Q_3$, the load of the photovoltaic element D is very small and accordingly the linearity of the output characteristic of the photovoltaic element D is retained over a wide range, so that a current which is nearly equal to the output current $i_1$ is obtained as the collector current $i_2$ of the transistor $Q_3$, and it is this collector current which forms the electrical quantity corresponding to the component $I_R$ formed by the eyepiece-entering light. It will be seen that with the embodiment of FIG. 4 this transistor $Q_3$ also is common to the photoresponsive means and the eyepiece light measuring means and in the illustrated position of the switch means $SW_1$, the collector current $i_2$ is transmitted through the switch $SW_1$, when it has the position shown in FIG. 4, to a logarithmic compression element $D_1$ so that in this way this collector current $i_2$ is logarithmically compressed. The output voltage $V_1$ serves to charge the memory capacitor $C_1$ across the terminals of which the logarithmic compression element $D_1$ is connected when the switch means $SW_1$ has the position shown in FIG. 4. This output voltage also acts as an input to the gate of the field effect type transistor $Q_1$. Thus, the collector current $i_3$ of the transistor $Q_2$ is of a value corresponding to the total of the light input components $I_F$ and $I_R$ as determined by the receiving of both of these components by the photovoltaic element D in the manner described above.

When the shutter release button of the camera is actuated, the memory switch means $SW_1$ is changed over from the position illustrated in FIG. 4 to the position where the lower blade of FIG. 4 opens the circuit of the capacitor $C_1$ and the upper blade of the switch means $SW_1$ of FIG. 4 engages the third contact $b$. Thus at this time the collector current $i_3$ is retained by the memory means formed by part of the circuit of the photoresponsive means, and with the mirror swung to its upper position the photovoltaic element D will receive only the eyepiece-entering light $I_R$. As a result the collector current $i_4$ of the transistor $Q_3$ has a magnitude which is approximately proportional to the light input intensity $I_R$ of the light received at this time by the photosensitive means D, and thus the transistor $Q_3$ functions also as the transistor of the eyepiece light measuring means.

The photoelectric output characteristic of the eyepiece-entering light compensation section formed by the photovoltaic element D and the transistor $Q_3$ is arranged so as to coincide with the photoelectric output characteristic of the light measurement memory section formed by the photovoltaic element D, the transistors $Q_2$ and $Q_3$, the logarithmic compression element $D_1$, the capacitor $C_1$ and the resistor $R_1$, so that the output current $i_5$ of the light measurement memory section obtained by the transistor $Q_2$ has a value which is approximately proportional to the light input component $I_F$ coming only from the object which is to be photographed. With this particular light measurement memory section of FIG. 4, the output current of the photovoltaic element D acts as the input to the emitter of the base-grounded transistor, so that, as compared with the embodiments of FIGS. 2 and 3, the connection of the photovoltaic element D into the electronic circuit is much easier with the embodiment of FIG. 4. In addition, since the photoelectric output current is obtained as the collector current of a base-grounded transistor having a constant current characteristic, it is not necessary to provide for the circuitry of FIG. 4 an additional transistor for eyepiece-entering light compensation. The transistor $Q_3$ acts as this latter transistor as well as for forming part of the photoresponsive means when the switch $SW_1$ has the position of FIG. 4 in order to transmit the collector current $i_2$ into the circuit of the photoresponsive means described above.

In addition, the characteristics of the circuitry of FIG. 4 are such that the temperature dependencies of the logarithmic compression element $D_1$ and the transistor $Q_2$ cancel each other resulting in an extremely small temperature dependency of the entire circuit, and the source voltage dependency of this circuit also is extremely small as a result of the particular circuit construction. In this way there is a great advantage in connection with mass-production of a light-measurement memory circuit conforming to the arrangement shown in FIG. 4.

It will be noted that in FIG. 4 the operation-timing section is indicated in the same simplified manner as was the case with FIG. 3, and the same is true with the illustration in FIG. 5. In the embodiment of FIG. 5 the single photovoltaic element D also is common to and forms part of the photoresponsive means for receiving the light components $I_F$ and $I_R$ and the eyepiece light measuring means for measuring only the light $I_R$ entering through the eyepiece. However, with the embodiment of FIG. 5 this photovoltaic element D is utilized as a photodiode. This photovoltaic element D of FIG. 5 is electrically connected with reverse bias between the collector and base of a photocurrent amplifying transistor $Q_4$. A pair of logarithmic compression elements $D_1$ and $D_2$ are respectively connected in series with the emitter and the collector of the amplifying transistor $Q_4$. The switch means $SW_1$ of this embodiment is in the form of a simple single-pole single-throw switch. When this switch means is in the closed position illustrated in FIG. 5 the light components $I_F$ and $I_R$ will be totalled. At this time the emitter current of the transistor $Q_4$ has a constant current source characteristic and is of a value approximately proportional to the light input intensity. This emitter current is logarithmically compressed by the lararithmic compression element $D_1$. The output voltage $V_1$ acts through the memory switch $SW_1$ to charge the memory capacitor $C_1$ across the terminals of which the logarithmic compression element $D_1$ is connected when the switch $SW_1$ is in the illustrated closed position. Through a suitable transmission which is actuated by depression of the shutter-release button of the camera, the mirror is swung up, but just before the mirror is swung up the transmission will also serve to move the switch means $SW_1$ from its closed to its open position. Then after the mirror has swung up the collector current $i_1$ is retained and the photosensitive means D receives only the light entering through the eyepiece so as to measure only the component $I_R$. Therefore at this time the emitter current of the transistor $Q_4$ has a value approximately proportional to the light input intensity of component $I_R$, as in the embodiment of FIG. 4. The emitter current is logarithmically compressed by the logarithmic compression element $D_2$. The resulting voltage $V_2$ acts as the input voltage to the transistor $Q_3$ of the eyepiece light measuring means. Thus, the collector current $i_2$ of the transistor $Q_3$ has a value determined by the eyepiece-entering light component $I_R$.

The logarithmic compression-expansion characteristic of the light measurement memory section, which consists of the logarithmic compression element $D_1$, the field effect type of transistor $Q_1$, the capacitor $C_1$, the resistor $R_1$ and the transistor $Q_2$, is arranged to coincide with the logarithmic compression-expansion characteristic of the eyepiece-entering light compensation section which consists of the logarithmic compression element $D_2$ and the transistor $Q_3$, so that the output current $i_3$ of the light measurement memory section obtained by way of the transistor $Q_2$ has a value corresponding only to and determined only by the intensity of the light input component $I_F$ coming from the object which is to be photographed. With the light measurement memory section of FIG. 5, by connecting the photovoltaic element D with reverse bias between the collector and base of the transistor $Q_4$, a high sensitivity photoelectric transformation output is obtained having a constant current source characteristic of small temperature dependency and also of extremely small voltage dependency. Furthermore, the temperature dependencies of the logarithmic compression element $D_1$ and the transistor $Q_2$ as well as of a logarithmic compression element $D_2$ and the transistor $Q_3$ cancel each other. The entire circuit has an extremely small source voltage dependency as a result of the construction illustrated in FIG. 5. In addition, since the switch means $SW_1$ is of a single-pole single-throw type, the light measurement memory circuit can be mass-produced very readily with great practical advantages.

With the embodiment of FIG. 6, as was the case with the embodiment of FIG. 5, upon light measurement the transistor $Q_2$ causes a collector current $i_1$ to flow, and this collector current corresponds to the total light input intensity of the components $I_F$ and $I_R$. The switch means $SW_1$ of this embodiment is a double-pole double-throw type of memory switch as described above and shown in FIG. 4. Thus, just prior to swinging up of the mirror so that the circuitry functions only to measure the eyepiece-entering light, the double-pole double-throw switch $SW_1$ of FIG. 6 has its blades shifted away from the first pair of contacts $a$ so as to open the circuit of the capacitor $C_1$ across whose terminals the logarithmic compression element $D_1$ was initially connected when the switch is in the position illustrated in FIG. 6. Simultaneously with the opening of the circuit which includes the memory capacitor $C_1$ the upper blade of FIG. 6 engages the contact $b$, so that the collector current $i_1$ is retained after the mirror has swung up and now the light-receiving element receives only the eyepiece-entering light component $I_R$ so that the emitter current $i_2$ of the transistor $Q_3$ has a value determined only by the eyepiece-entering light component $I_R$. The photoelectric output characteristic determined by the light-receiving element D and the transistor $Q_3$ is arranged to coincide with the photoelectric output characteristic of the light measurement memory section made up of the light receiving element D, the transistor $Q_3$, the logarithmic compression element $D_1$, the field effect type of transistor $Q_1$, the capacitor $C_1$ and the transistor $Q_2$, so that the output current $i_3$ of the light measurement memory section obtained through the transistor $Q_2$ has a value determined only by and corresponding only to the light input $I_F$ coming from the object to be photographed. As compared with the embodiment of FIG. 5, it is possible for the embodiment of FIG. 6 to function without any special use of the eyepiece-entering light compensation circuit section, so that the circuit of FIG. 6 has an exceedingly simple construction. Furthermore, with the embodiment of FIG. 6 the light measuring memory circuit has an exceedingly small temperature dependency and also an exceedingly small source voltage dependency.

It will be noted that with the embodiment of FIG. 6 as was the case with FIG. 5 the transistor which is connected to the photovoltaic element D serves as a photocurrent amplifying transistor. However, with the embodiment of FIG. 6 it is possible to eliminate the logarithmic compression element $D_2$ and the transistor $Q_3$ of FIG. 5.

In the embodiment of FIG. 7, the photosensitive means is formed by the photoconductive element CdS, such as a cadmium sulfide light-receiving element. This photoconductive element of FIG. 7 replaces the photovoltaic element D and the transistor $Q_4$ of FIG. 5. Otherwise the embodiment of FIG. 7 is identical with that of FIG. 5. With this particular example during measurement only of the light entering through the eyepiece, the temperature dependency of the photoconductive element is also compensated. Accordingly an exceedingly stable light measurement memory circuit is achieved with an extremely small temperature dependency providing an exceedingly great practical advantage.

It will thus be seen that with the invention as described above during through-the-lens light measurement, all of the influence of light entering through the eyepiece is completely compensated as a result of the functioning of the electron circuit without special consideration being given to the conventional mechanical location or arrangement of the light-receiving element or to the method of light measurement, so that with the electric shutter control circuit having the memory function, the eyepiece-entering light compensation circuit of the present invention can be incorporated in a highly effective manner. In addition, as a result of the particular circuit construction shown in the drawings and described above, the light measurement memory section has an exceedingly small temperature dependency and source voltage dependency, and these advantages are achieved in an exceedingly simple manner. Thus the present invention has great practical advantages.

What is claimed is:

1. In a camera having an objective through which light enters into the interior of the camera and an eyepiece through which light also is capable of entering into the interior of the camera, photoresponsive means for receiving the light entering into the interior of the camera through the objective and through the eyepiece and for converting said light into a corresponding first electrical quantity, eyepiece light measuring means for measuring the light entering into the camera only through the eyepiece thereof and for converting the eyepiece-entering light into a second electrical quantity corresponding to the eyepiece-entering light, and electrical circuit means operatively connected with said photoresponsive means and eyepiece light measuring means for subtracting said second quantity from said first quantity and for providing an output electrical quantity equal only to the light entering through the objective, so that said output quantity can be used in the determination of the extent of exposure of film in the camera.

2. The combination of claim 1 and wherein said photoresponsive means and said eyepiece light measuring means respectively include a pair of transistors wherein the collector current of the transistor of said photoresponsive means forms said first quantity and the emitter current of the transistor of said eyepiece light measuring means forms said second quantity, said electrical circuit means connecting said transistors with a pair of conductors for said collector and emitter currents having a common junction, said circuit means including a third conductor for said output electrical quantity also connected electrically to said common junction so that said output quantity is in the form of an output current corresponding only to the light received by the objective of the camera, a single photosensitive means being common to and forming part of said photoresponsive means, on the one hand, and said eyepiece light measuring means, on the other hand, said single photosensitive means being a photovoltaic element connected between the base and collector of said transistor of said eyepiece light measuring means and the latter transistor being a photocurrent amplifying transistor common to said eyepiece light measuring means and said photoresponsive means, and a switch means also common to said eyepiece light measuring means and said photoresponsive means, said switch means being a double-pole double-throw switch having a pair of blades one of which is permanently connected with the emitter of said amplifying transistor and the other of which is permanently connected in the circuit of said photoresponsive means, the latter circuit including a memory capacitor for maintaining the collector current of the transistor of said photoresponsive means when said other blade of said switch means assumes an open position, said switch means initially having a position where said blades respectively engage a first pair of contacts for connecting said emitter of said amplifying transistor to said photoresponsive means and for closing the circuit of said photoresponsive means to close the circuit which includes said capacitor, and said switch means including only a third contact engaged by the blade of said switch means which is connected to said emitter of said amplifying transistor when said blades are displaced away from said first pair of contacts for opening the circuit which includes said capacitor and for closing the circuit of said eyepiece light measuring means, said electrical circuit means connecting said third contact to said junction for transmitting the emitter current of said amplifying transistor to said junction for providing the output current corresponding to the difference between the collector current of said transistor of said photoresponsive means and the emitter current of the amplifying transistor.

3. The combination of claim 1 and wherein said photoresponsive means and said eyepiece light measuring means respectively include a pair of transistors which are respectively of equal electrical characteristics but are of reversed polarities with respect to each other and said transistors respectively having collector currents which respectively form said first and second quantities, said electrical circuit means connecting said transistors in series and including a pair of conductors for said collector currents having a common junction, said circuit means including a third conductor for said output electrical quantity also connected electrically to said common junction so that said output quantity is in the form of an output current corresponding only to the light received by the objective of the camera.

4. The combination of claim 3 and wherein said photoresponsive means and eyepiece light measuring means respectively include a pair of photosensitive means respectively connected electrically with said transistors for coacting therewith for respectively providing said collector currents.

5. The combination of claim 3 and wherein a single photosensitive means is common to and forms part of said photoresponsive means, on the one hand, and said eyepiece light measuring means, on the other hand, and wherein a switch means is also common to and forms part of said photoresponsive means and said eyepiece light measuring means, said switch means having one position for connecting said photosensitive means into a circuit of said photoresponsive means for providing the collector current of said photoresponsive means and another position for placing said photosensitive means in a circuit of said eyepiece light measuring means for providing the collector current of the latter means, said photoresponsive means and eyepiece light measuring means respectively forming a pair of means to one of which said switch means connects said photosensitive means first and the other of which said switch means connects said photosensitive means second, and memory means forming part of that one of said pair of means to which said photosensitive means is first connected by said switch means for retaining the collector current of said one of said pair of means while said switch means connects said photosensitive means to the other of said pair of means.

6. The combination of claim 5 and wherein said switch means first connects said photosensitive means to said photoresponsive means and said memory means including a memory capacitor forming part of said photoresponsive means for maintaining said collector current thereof while said switch means connects said photosensitive means to said eyepiece light measuring means.

7. The combination of claim 6 and wherein said photosensitive means is a photovoltaic element, said transistor of said eyepiece light measuring means also forming part of said photoresponsive means, said transistor of said eyepiece light measuring means being base-grounded and having an emitter electrically connected to said photosensitive means to receive its input therefrom, said switch means being a double-pole double-throw switch having a pair of blades one of which is permanently connected into the circuit of said capacitor and the other of which is permanently connected to the collector of said base-grounded transistor, said switch having a first pair of contacts respectively engaged first by said blades and respectively forming part of said circuit of said photoresponsive means for providing said collector current thereof, and said switch including only a third contact engaged only by the blade connected to said collector of said base-grounded transistor when said blades are displaced from said first contacts to disconnect the capacitor from said photosensitive means, said third contact being electrically connected to said junction through a conductor for said collector current of said eyepiece light measuring means so that the latter collector current is provided through said base-grounded transistor when said blades are spaced from said first contacts and the circuit is closed through said third contact.

8. The combination of claim 6 and wherein said switch means is a double-pole double-throw switch and said photosensitive means is a photovoltaic element.

9. The combination of claim 8 and wherein said double-pole double-throw switch has a pair of blades between which said photovoltaic element is permanently connected, said switch including a first pair of contacts respectively first engaged by said blades and connected to a circuit which includes said capacitor and said switch means including a second pair of contacts engaged by said blades subsequent to engagement of said first pair of contacts, and said second pair of contacts being connected to a circuit which includes said transistor of said eyepiece light measuring means.

10. The combination of claim 6 and wherein said switch means is a single-pole double-throw switch having a blade permanently connected electrically to said photosensitive means and having a pair of contacts one of which is engaged first by said blade and forms part of a circuit which includes said capacitor and the other of which is engaged next by said blade and forms part of a circuit which includes said transistor of said eyepiece light measuring means.

11. The combination of claim 10 and wherein said eyepiece light measuring means further includes an expansion transistor and a logarithmic compression element.

12. The combination of claim 6 and wherein said photosensitive means is a photovoltaic element, and a photocurrent amplifying transistor common to and forming part of said photoresponsive means and eyepiece light measuring means, said photovoltaic element being connected between the base and collector of said amplifying transistor, and a pair of logarithmic compression elements respectively connected in series with the emitter and collector of said amplifying transistor, and said switch means being a single-pole single-throw switch having a closed position for closing the circuit of said photoresponsive means which includes said capacitor and an open position for providing the collector current of said transistor of said eyepiece light measuring means.

13. The combination of claim 12 and wherein one of said logarithmic compression elements is connected across the terminals of said capacitor by said switch when the latter is in its closed position.

14. The combination of claim 6 and wherein said photosensitive means is a photoconductive element.

15. The combination of claim 14 and wherein said switch means is a single-pole single-throw switch having first a closed position for closing a circuit which includes said capacitor and then an open position for opening the latter circuit.

16. The combination of claim 15 and wherein a pair of logarithmic compression elements are respectively connected in series with said photoconductive element with the latter situated between said logarithmic compression elements, one of the latter elements being connected across the terminals of said capacitor when said switch is closed, and the other of said logarithmic compression elements being connected between the base and emitter of the transistor of said eyepiece light measuring means so that when said switch is open the collector of the latter transistor will provide the current corresponding to the eyepiece entering light.

* * * * *